(12) United States Patent
Grabau

(10) Patent No.: US 8,469,672 B2
(45) Date of Patent: Jun. 25, 2013

(54) BLADE FOR A WIND TURBINE ROTOR

(75) Inventor: Peter Grabau, Kolding (DK)

(73) Assignee: LM Glasfiber A/S, Lunderskou (DK)

( * ) Notice: Subject to any disclaimer, the term of this patent is extended or adjusted under 35 U.S.C. 154(b) by 0 days.

(21) Appl. No.: 13/446,715

(22) Filed: Apr. 13, 2012

(65) Prior Publication Data
US 2012/0257982 A1 Oct. 11, 2012

Related U.S. Application Data

(63) Continuation of application No. 12/083,638, filed as application No. PCT/DK2006/000582 on Oct. 17, 2006, now Pat. No. 8,177,517.

(30) Foreign Application Priority Data

Oct. 17, 2005 (DK) .................................. 2005 01451

(51) Int. Cl.
F03D 11/00 (2006.01)
(52) U.S. Cl.
USPC ........................ 416/248; 416/222; 416/241 R
(58) Field of Classification Search
USPC ...................... 416/222, 248, 241 R
See application file for complete search history.

(56) References Cited

U.S. PATENT DOCUMENTS

| 1,338,874 | A | * | 5/1920 | Shaffer ..................... 416/200 R |
| 1,780,431 | A | | 11/1930 | McCarroll |
| 1,820,529 | A | | 8/1931 | Darrieus |
| 1,886,891 | A | | 11/1932 | Martens et al. |
| 4,081,221 | A | | 3/1978 | Andrews |
| 5,161,952 | A | | 11/1992 | Eggers, Jr. |

FOREIGN PATENT DOCUMENTS

| CA | 2 395 612 A1 | 8/2001 |
| EP | 0 009 767 A2 | 4/1980 |
| EP | 0 295 353 A1 | 12/1988 |
| GB | 758628 | 10/1956 |
| WO | 98/31934 A1 | 7/1998 |

* cited by examiner

Primary Examiner — Ninh H Nguyen
(74) Attorney, Agent, or Firm — Nath, Goldberg & Meyer; Jerald L. Meyer; Sanjana Mangalagiri

(57) ABSTRACT

Provided is a blade for a rotor of a wind turbine having a substantially horizontal rotor shaft, said rotor comprising a hub, from which the blade extends substantially radially when mounted, said blade having a chord plane extending between a leading edge and a trailing edge of said blade, a root area closest to the hub, an airfoil area furthest away from the hub, a transition area between the root area and the airfoil area, a first airfoil extending substantially along the entire airfoil area, and a second airfoil separately mounted to the blade, said second airfoil arranged at a mutual distance transverse to the chord plane and extending along the root area of the blades.

18 Claims, 9 Drawing Sheets

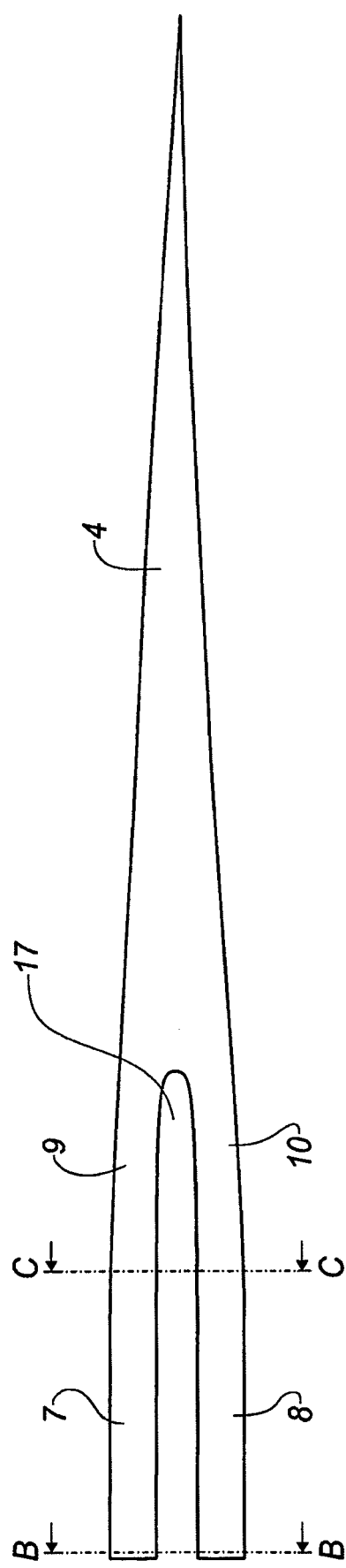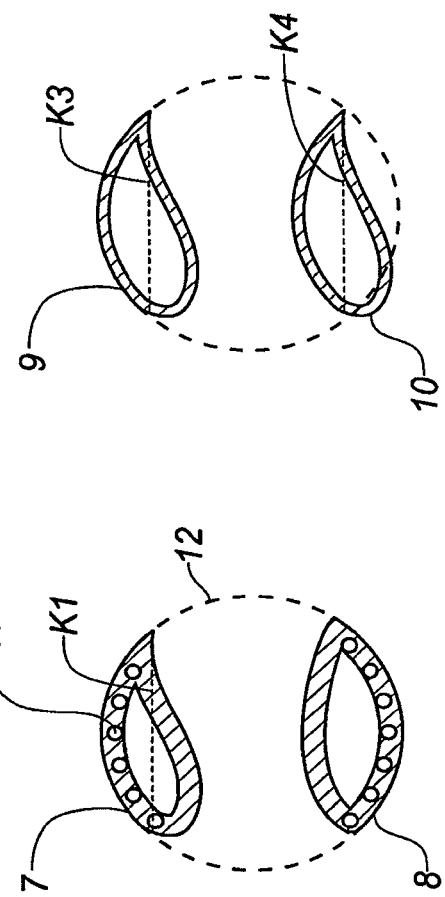

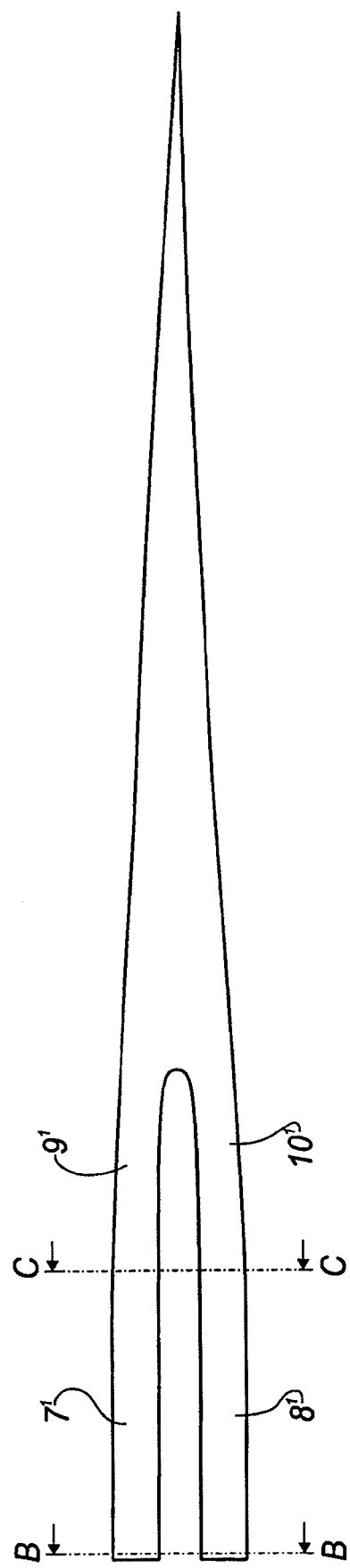
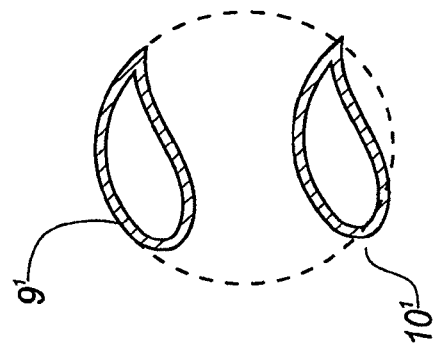
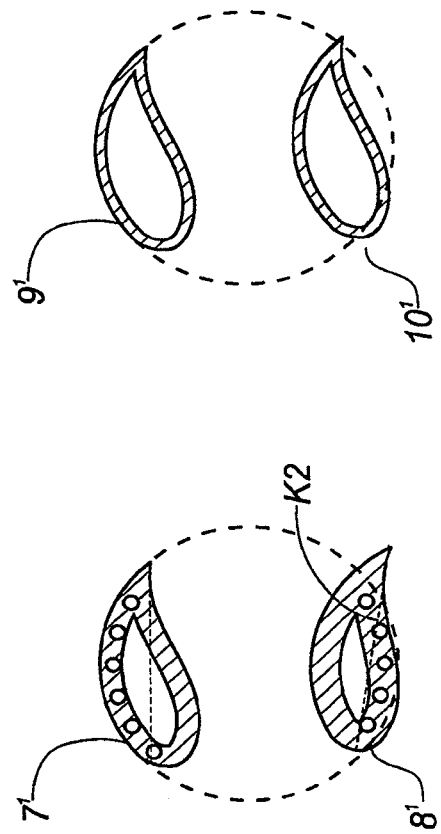

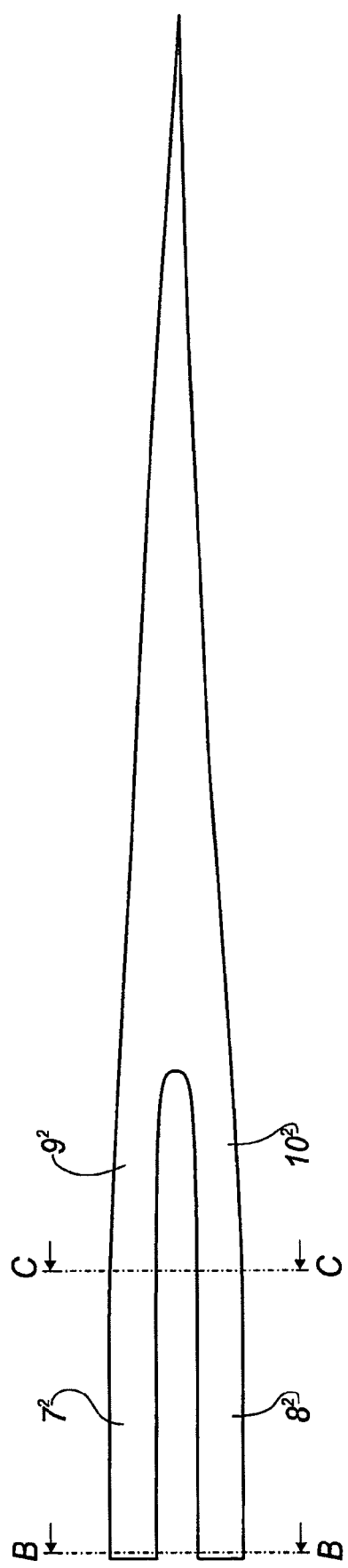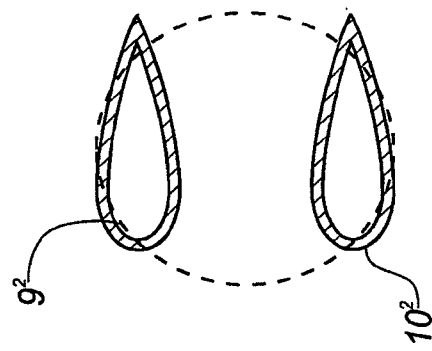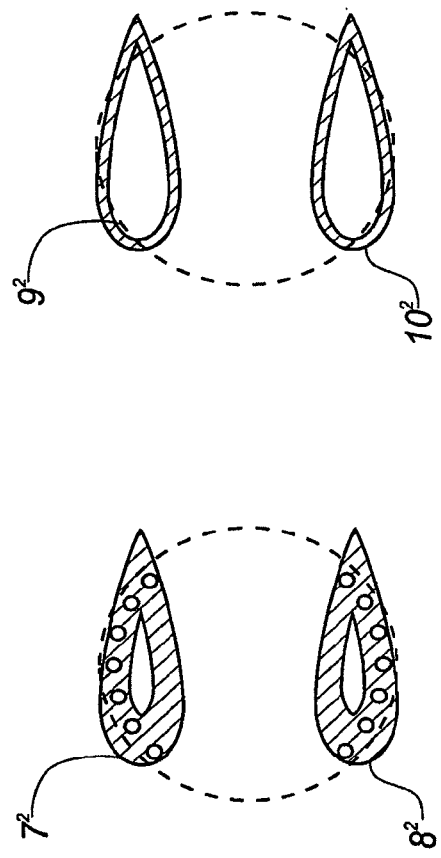
Fig. 5A
Fig. 5B
Fig. 5C

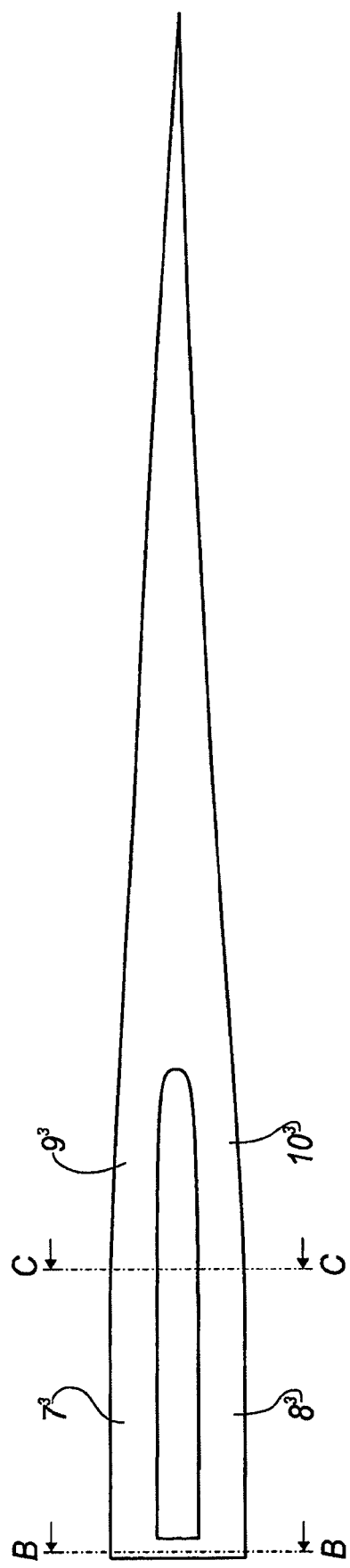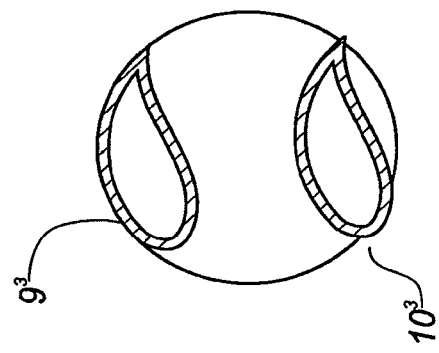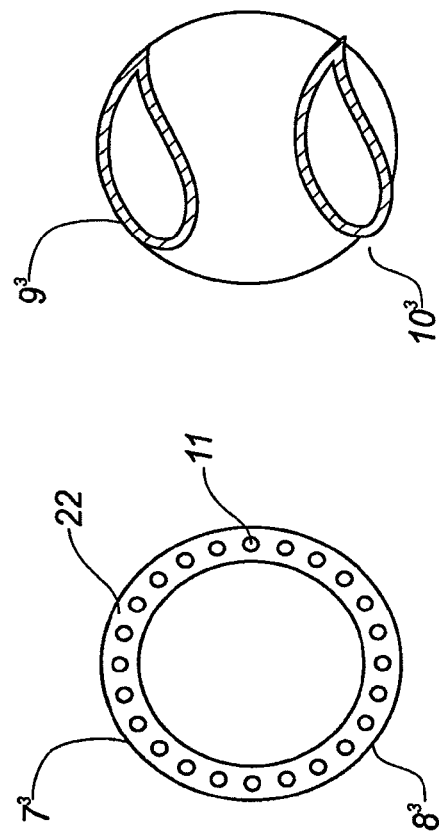
Fig. 6A
Fig. 6B
Fig. 6C

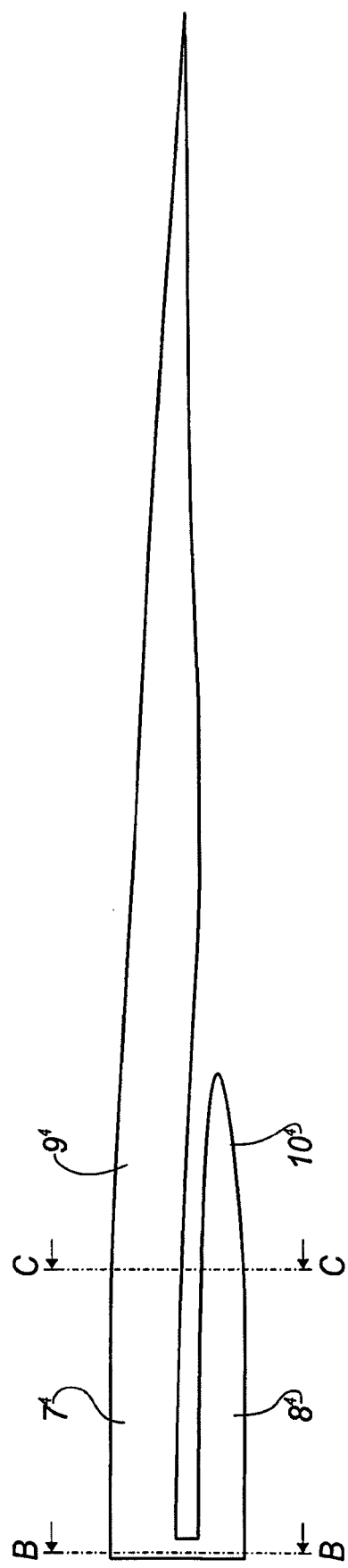
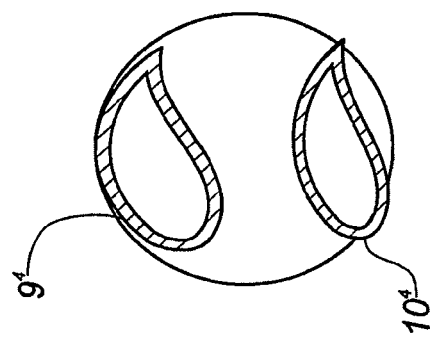
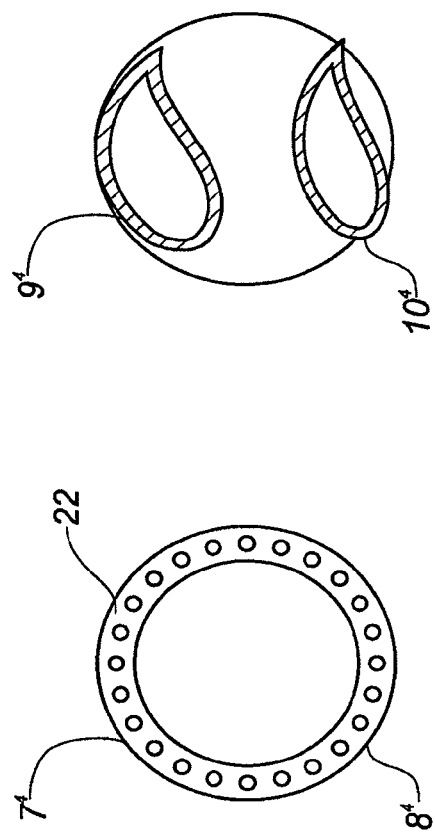
*Fig. 7A*
*Fig. 7B*
*Fig. 7C*

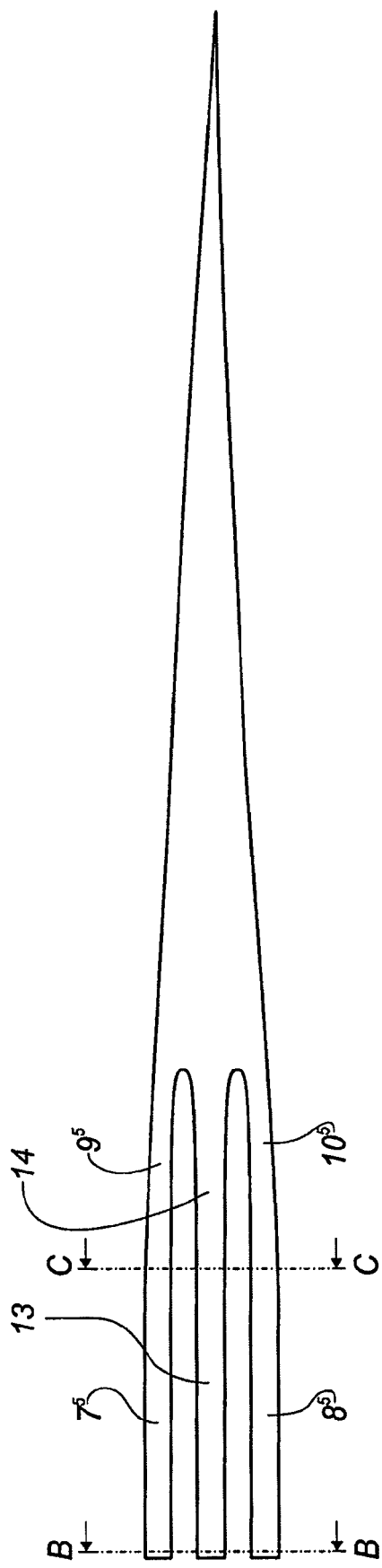
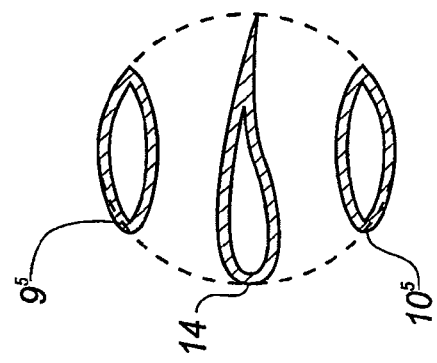
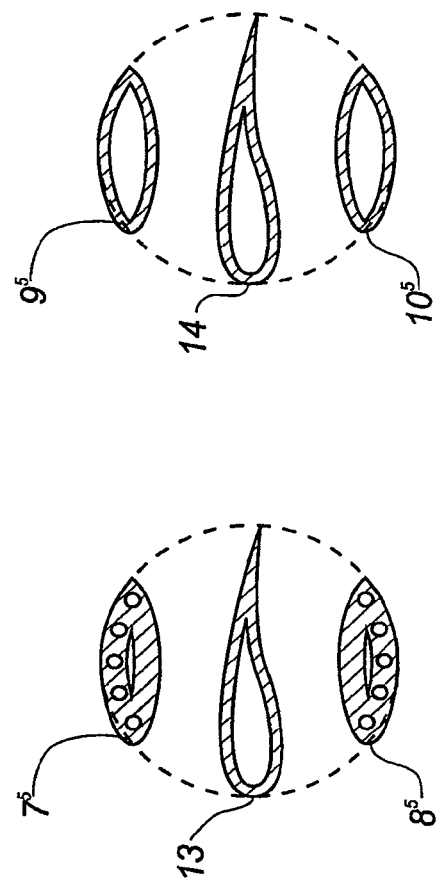
Fig. 8A
Fig. 8B
Fig. 8C

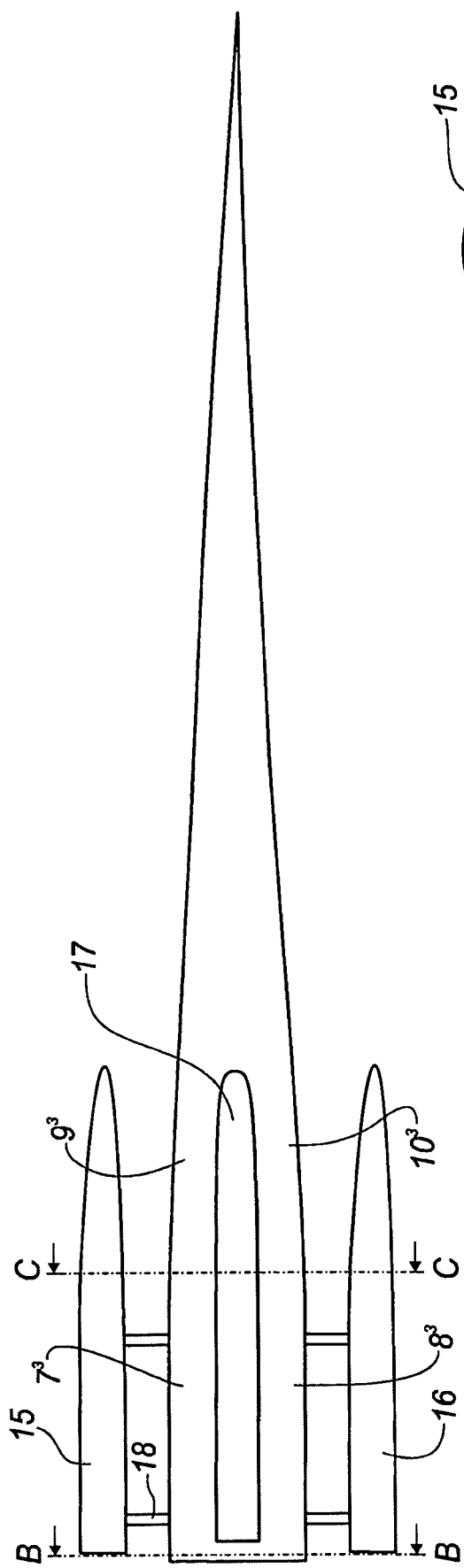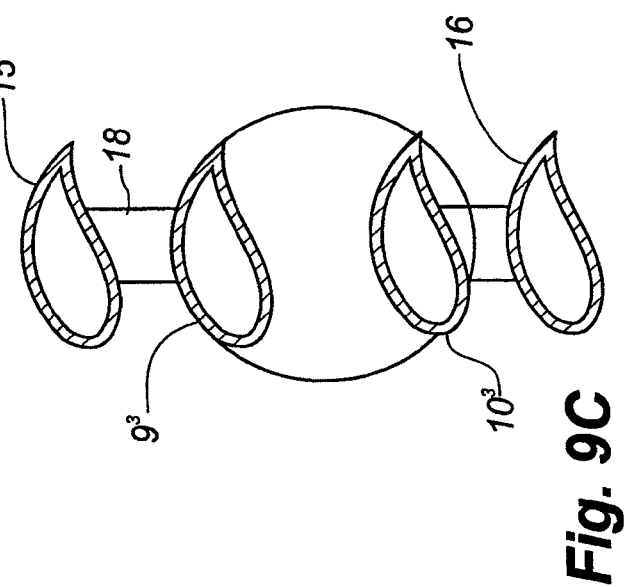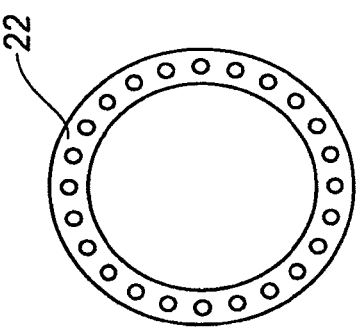

BLADE FOR A WIND TURBINE ROTOR

This is a Continuation Application of U.S. patent application Ser. No. 12/083,638, filed Apr. 16, 2008, which was filed under 35 U.S.C. §371 as a national stage of PCT/DK2006/000582, filed Oct. 17, 2006, which claims priority to Danish application PA 2005 01451, filed on Oct. 17, 2005, the contents of each of which are hereby incorporated by reference in their entirety.

TECHNICAL FIELD

The present invention relates to a blade for a rotor of a wind turbine having a substantially horizontal rotor shaft, said rotor comprising a hub, from which the blade extends substantially radially when mounted, said blade comprising a chord plane extending between the leading edge and the trailing edge of said blade, and said blade comprising a root area closest to the hub, an airfoil area furthest away from the hub and a transition area between the root area and the airfoil area, and said blade comprising a single airfoil along substantially the entire airfoil area.

BACKGROUND ART

Ideally, a blade of the airfoil type is shaped like a typical aeroplane wing, where the chord plane width of the blade as well as the first derivative thereof increase continuously with decreasing distance from the hub. This results in the blade, ideally being comparatively wide in the vicinity of the hub. This again results in problems when having to mount the blade to the hub, and, moreover, this causes great loads when the blade is mounted, such as storm loads, due to the large surface area of the blade.

Therefore, over the years, the construction of blades has developed towards a shape, where the blade consists of a root area closest to the hub, an airfoil area furthest away from the hub and a transition area between the root area and the airfoil area. The airfoil area has an ideal or almost ideal blade shape, whereas the root area has a substantially circular cross-section, which reduces the storm loads and makes it easier and more safe to mount the blade to the hub. The root area diameter is preferably constant along the entire root area. Due to the circular cross-section, the root area does not contribute to the production of the wind turbine and, in fact, lowers the production a little because of wind resistance. As is suggested by the name, the transition area has a shape gradually changing from the circular shape of the root area to the airfoil profile of the airfoil area. Typically, the width of the transition area increases substantially linearly with increasing distance from the hub.

It is well known from the aeroplane industry that aeroplanes built with two wings, so called biplanes, can normally lift more than an aeroplane with only one wing. This allows for an increase of the total lift of the wings of the aeroplane without increasing the width of the wings.

This principle is also know in connection with blades for wind turbines, i.a. by manufacturing wind turbines with two or more rotors. CA 2 395 612 describes a wind turbine with two co-axial rotors where one rotor rotates faster than the second. GB 758 628 describes a wind turbine with two co-axial rotors rotating in opposite directions.

WO 98/31934 discloses a blade designed like with a biplane. The blade is constructed by means of two parallel spars mutually connected by means of cross braces. Two streamlined elements are fixed on each spar, said elements comprising a leading edge and a trailing edges, respectively, together providing an airfoil.

U.S. Pat. No. 5,161,952 discloses a biplane construction for wind turbine rotors. The wind turbine is designed so that two straight blades are connected with the hub of the rotor at a distance from each other. The tips of the two blades are interconnected.

DISCLOSURE OF INVENTION

The object of the invention is to provide a new and improved blade construction.

According to the invention, this object is achieved by the blade comprising at least a first root segment and a second root segment along substantially the entire root area, said segments being arranged with a mutual distance transverse to the chord plane, and by at least one of the root segments having an airfoil profile. In this way, the root segment having the airfoil profile contributes to the production of the wind turbine.

According to a preferred embodiment of the blade according to the invention, the chord plane of the blade is twisted in the longitudinal direction of the blade, where the twist may be up to 80 degrees in the longitudinal direction of the blade. Typically, the twist is between 60 and 70 degrees. Usually, the first derivative of the twist increases with decreasing distance to the hub, which means, that the twist of the chord plane K1 in the root area 2 preferably is comparatively high.

According to a preferred embodiment of the invention, the chord plane of at least the one root segment with airfoil profile is substantially parallel to the chord plane of the blade itself in the area closest to the hub. Preferably, the chord plane of the blade is twisted in the longitudinal direction of the blade in order to compensate for the increase in local velocity of the blade with increasing distance from the hub, which means that the blade "sees" the wind direction differently depending on the radius from the hub. This means that in this embodiment, the course of the chord plane in the longitudinal direction of the root area is a continuation of the course of the chord plane in the longitudinal direction of the airfoil area and/or the transition area.

According to a particular embodiment of the invention, both the first and the second root segment are provided with airfoil profiles. In this way, both root segments contribute to the production of the wind turbine and may be designed such that the total contribution from the two segments corresponds to the contribution of the wide portion of the ideal blade.

According to a preferred embodiment, the chord plane of the at least one root segment with airfoil profile has a substantially constant width, the chord plane of the transition area becoming wider with increasing distance from the hub, and the chord plane of the airfoil area becoming narrower with increasing distance from the hub. Thus, the blade according to the invention has a shape corresponding to conventional blades, so that existing moulds for blades may be modified in a comparatively simple way in order be able to manufacture the new types of blades.

According to a particular embodiment, the transition area comprises at least a first transition segment and a second transition segment, said segments being arranged with a mutual distance, as seen transverse to the chord plane, where at least one of the transition segments is provided with an airfoil profile. Preferably, the chord plane of the at least one transition segment with airfoil profile is substantially parallel to the chord plane of the blade itself at the transition between the transition area and the air-foil area, and preferably, both transition segments are provided with airfoil profiles.

Typically, the total length of the root area and the transition area is between 5% and 35% of the total length of the blade, and often between 5% and 25% of the total length of the blade or even between 5% and 15% of the total length of the blade.

According to a preferred embodiment of the invention, the first and the second root segment are joined at the portion of the transition area closest to the hub. In this way, the transition area may have a shape corresponding to a conventional blade, while only the root area has a dual profile.

According to another embodiment of the blade, the first and the second root segment merge into the first and the second transition segment, where the first and the second transition segment are joined with the portion of the transition area furthest away from the hub. In this way, the transition area also has a dual structure and thus a potentially greater lift.

According to a preferred embodiment, the first and the second root segment are joined to form a common mounting area at the portion of the root area closest to the hub. Preferably, this mounting area has a substantially circular cross-section. In this way, the blade according to the invention may have a mounting flange corresponding to conventional blades so that these new blades fit into existing hubs.

According to a preferred embodiment, the blade is made up of a shell body made of a polymer material reinforced with glass fibres or carbon fibres. Preferably, the blade is designed as a single whole shell body.

Alternatively, the at least one root segment with airfoil profile may have a separately mounted segment. This embodiment is advantageous in that said segments may be used for existing wind turbines without having to exchange the blades, e.g. by mounting segments to the root part of already installed blades. It is also apparent that not all root segments are necessarily secured to the hub.

BRIEF DESCRIPTION OF THE DRAWING

The invention is explained in detail below with reference to the drawing, in which FIG. 3-9 show different embodiments of the blade according to the invention.

BEST MODES FOR CARRYING OUT THE INVENTION

Figure 1:
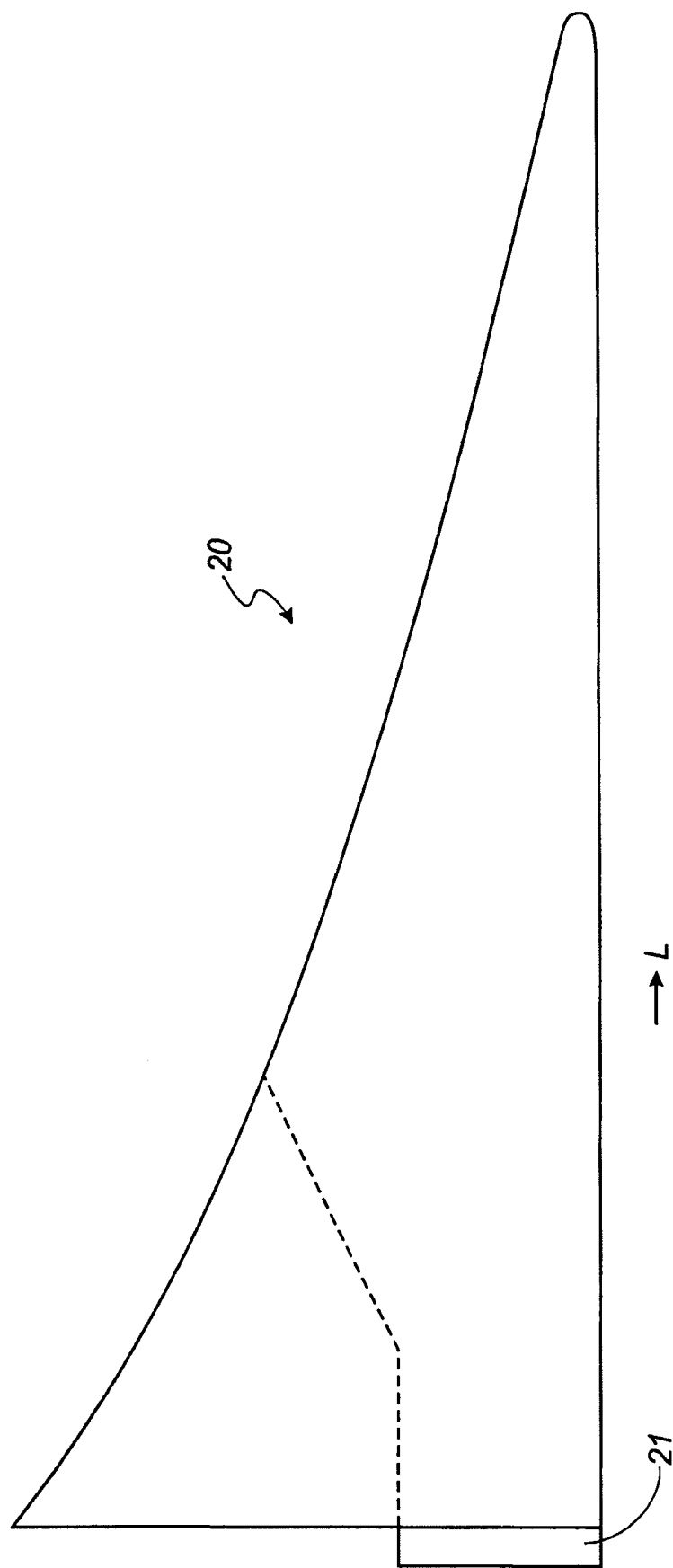
FIG. 1 shows a top view of an ideal blade of the airfoil type.

FIG. 1 shows an embodiment of an ideal blade 20 of the airfoil type. The blade is provided with a root part 21 adapted to be secured to a hub of a wind turbine. The ideal blade 20 is designed such that the width of the blade 20 decreases with increasing distance L from the hub. Moreover, the first derivative of the width of the blade 20 also decreases with increasing distance from the hub 20, which means that, ideally, the blade 20 is very wide at the root area 21. This causes problems with respect to securing the blade 20 to the hub. Moreover, when mounted, the blade 20 impacts the hub with large storm loads because of the large surface area of the blade 20.

Therefore, over the years, the construction of blades has developed towards a shape, where the outer part of the blade corresponds to the ideal blade 20, whereas the surface area of the root area is substantially reduced compared to the ideal blade. This embodiment is illustrated with a dashed line in FIG. 1, a perspective view thereof being shown in FIG. 2.

Figure 2:
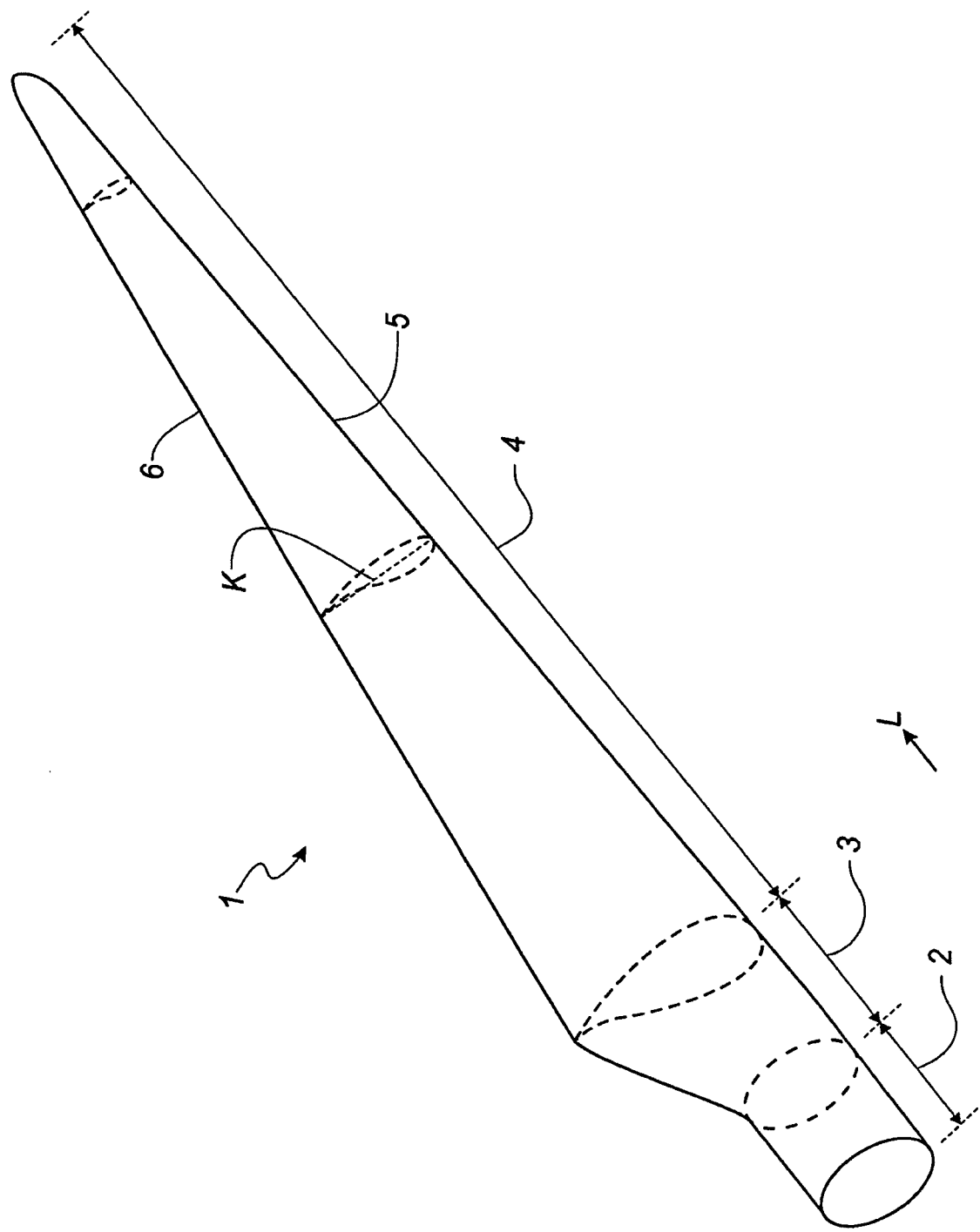
FIG. 2 shows a perspective view of a conventional blade of the airfoil type.

As seen from FIG. 2, the conventional blade 1 comprises a root area 2 closest to the hub, an airfoil area 4 furthest away from the hub and a transition area 3 between the root area 2 and the airfoil area 4. The blade 1 comprises a leading edge 5 facing the direction of rotation of the blade 1, when the blade is mounted on the hub, and a trailing edge 6 facing in the opposite direction to the leading edge 5. The airfoil area 4 has an ideal or almost ideal blade shape, whereas the root area 2 has a substantially circular cross-section, which reduces storm loads and makes it easier and more safe to mount the blade 1 to the hub. Preferably, the diameter of the root area 2 is constant along the entire root area 2. The transition area 3 has a shape gradually changing from the circular shape of the root area 2 to the airfoil profile of the airfoil area 4. The width of the transition area 3 increases substantially linearly with increasing distance L from the hub.

The airfoil area 4 has an airfoil profile with a chord plane K extending between the leading edge 5 and the trailing edge 6 of the blade 1. The width of the chord plane decreases with increasing distance L from the hub. It should be noted that the chord plane does not necessarily run straight over its entire extent, since the blade may be twisted and/or curved, thus providing the chord plane with a correspondingly twisted and/or curved course, this being most often the case in order to compensate for the local velocity of the blade being dependent on the radius from the hub.

Due to the circular cross-section, the root area 2 does not contribute to the production of the wind turbine and, in fact, lowers the production a little because of wind resistance. The idea behind the invention is therefore to divide the root area 2 and optionally also the transition area 3 into two or more segments, where at least one of these segments has a profile providing lift to this part of the blade 1 and thus contributing to the production of the wind turbine.

FIG. 3A shows a first embodiment of a blade according to the invention, where the blade is seen towards the leading edge 5, while FIG. 3B shows a section along the line BB and FIG. 3C shows a section along the line CC of FIG. 3A, where section CC is situated at the transition between the root area 2 and the transition area 3. According to this embodiment, the root area 2 is divided into a first root segment 7 and a second root segment 8, and the transition area 3 is divided into a first transition segment 9 and a second transition segment 10. The two transition segments 9 and 10 are joined at the transition between the transition area 3 and the airfoil area 4. As a result, there is a gap 17 between the segments. Additionally, the segments may be mutually connected by means of stiffening means arranged in the space 17 between the segments. These stiffening means may for example be provided as a grid construction of e.g. steel and may further be provided with for example a so-called drag reduction profile, where the cross-section of the profile has a symmetrical drop shape. In this way, the wind resistance of the stiffening means is reduced, and noise immissions may be lowered.

FIG. 3B shows the mounting area of the blade. The profiles of the blade segments in this area are formed such that they lie within a corresponding conventional blade with circular root part (shown with the dashed line 12). The first root segment 7 is provided with an airfoil profile in the mounting area comprising a chord plane K1, while the second root segment 8 is provided with a profile reducing the wind resistance of the segment, without necessarily contributing to the production of the wind turbine. The first, root segment 7 merges into the first transition segment 9 also provided with an airfoil profile comprising a chord plane K3. The second root segment 8 merges into the second transition segment 10 and changes gradually from a profile with reduced wind resistance at the mounting area to an actual airfoil profile comprising a chord plane K4 at the second transition segment 10. The chord plane K of the blade is usually twisted along the longitudinal direction of the blade to compensate for the local velocity of the blade. Therefore, the course of the chord planes K1, K3, and K4 are a continuation of the course of the chord plane K of the blade in the airfoil area 4.

The chord plane K of the blade may be twisted as much as 75-80 degrees in the longitudinal direction of the blade, but typically between 60 and 70 degrees. Usually, the first derivative of the twist increases with decreasing distance to the hub, which means that the twist of the chord plane K1 in the root area 2 is preferably comparatively high.

The first root segment 7 and the second root segment 8 are provided with a number of mounting holes 11 in the mounting area. These holes 11 have the same position as in a conventional blade with circular root part 12. Thus, the new blade according to the invention may be mounted on conventional hubs and thus replace existing blades during a renewal in a simple manner.

FIGS. 4 and 5 show a second and third embodiment of the invention, respectively, and which are modifications of the embodiment shown in FIG. 3. Therefore, only the differences are discussed here. In the second embodiment shown in FIG. 4 the second root segment $8^1$ is also provided with an airfoil profile comprising a chord plane K2 at the mounting area. Furthermore, the profile of the root segment $8^1$ extends beyond the conventional circular profile of the root part 12, as is apparent in FIG. 4B. The figure also shows that the chord planes of the two segments may be mutually angled.

According to the third embodiment shown in FIG. 5, the first and the second root segments $7^2$, $8^2$ as well as the first and the second transition segments $9^2$, $10^2$ have symmetric profiles. The profiles are shown with the chord planes parallel to the direction of rotation of the blade, however, the profiles may preferably be angled with respect to the direction of rotation, where the angle is selected based on maximising the lift.

As seen from FIG. 5B, both the first root segment $7^2$ and the second root segment $8^2$ extend beyond the circular profile of the conventional root part 12. Finally, it should be noted that the root segments of the embodiment shown in FIGS. 4 and 5 as well as the embodiment shown in FIG. 3 each merge into a corresponding transition segment ($9^2$, $9^3$, $10^2$, $10^3$), said segments joining to form a common profile at the transition between the transition area 3 and the airfoil area 4.

FIG. 6 shows a fourth embodiment of the blade, where the first root segment $7^3$ and the second root segment $8^3$ are joined at the mounting area 22. As seen in FIG. 6B, the mounting area 22 is circular and contains mounting holes 11, the blades being secured to the hub by bolts through said holes. The blade is thus adapted to conventional hubs and can thus replace existing blades on already installed wind turbines during a renewal.

FIG. 7 shows a fifth embodiment of the blade, where the first root segment $7^4$ and the second root segment $8^4$ are joined at the mounting area 22, but where the two segments are not joint at a distance to the hub, but instead appear as two separate blade parts with different lengths. It is also apparent from FIG. 7 that the various root segments do not necessarily have the same thickness.

FIG. 8 shows a sixth embodiment of the blade, where a first, a second and a third root segment $7^5$, $8^5$, 13 merge into a first, a second and a third transition segment $9^5$, $10^5$, 14, respectively. The first and the second root segments $7^5$, $8^5$ as well as the first and the second transition segments $9^5$, $10^5$ are here shown with a shape reducing the wind resistance of these segments, while the third root segment 13 and the third transition segment 14 are provided with an actual airfoil profile. However, the profiles may all be provided with profiles increasing the lift of the corresponding areas and thereby also the production of the wind turbine. Of course, the three root segments $7^5$, $8^5$, 13 may be joined at the mounting area just like the embodiment shown in FIGS. 6 and 7.

FIG. 9 shows an embodiment corresponding to the embodiment of FIG. 6, but where the blade is additionally provided with a first separately mounted blade part 15 and a second separately mounted blade part 16. The separately mounted blade parts 15, 16 are mounted on the first and the second root segment $7^3$, $8^3$, respectively, by means of a number of retaining means 18. The blade parts 15 and 16 extend along the root area 2 and optionally also along the transition area 3 of the blade. The blade itself does not necessarily have to have two root segments and/or transition segments, but may have a form where there is no gap 17, no root segments and/or transition segments, in which case the root area and the transition area of the blade correspond to a conventional blade. This embodiment is advantageous in that the separately mounted blade parts 15, 16 may be mounted without having to exchange the blades on already installed wind turbines. The retaining means may be formed with e.g. a drag reduction profile for lowering wind resistance and noise immissions.

The invention has been described with reference to preferred embodiments. Many modifications are conceivable without thereby deviating from the scope of the invention. Modifications and variations apparent to those skilled in the art are considered to fall within the scope of the present invention. For example, the embodiment shown in FIG. 9 may have only a single separately mounted blade part. Embodiments are also conceivable where the various segments have a separate blade angle regulation.

REFERENCE NUMERAL LIST 1 blade
2 root area
3 transition area
4 airfoil area
5 leading edge
6 trailing edge
7 first root segment
8 second root segment
9 first transition segment
10 second transition segment
11 mounting hole
12 circular root part
13 third root segment
14 fourth root segment
15 first separately mounted blade part
16 second separately mounted blade part
17 gap
18 retaining means
20 blade
21 root part
22 mounting area
Kx chord plane
L longitudinal direction

The invention claimed is:
1. A blade for a rotor of a wind turbine having a substantially horizontal rotor shaft, said rotor comprising a hub, from which the blade extends substantially radially when mounted, said blade comprising:

a chord plane extending between a leading edge and a trailing edge of said blade;
a root area closest to the hub;
an airfoil area furthest away from the hub;
a transition area between the root area and the airfoil area;
a first airfoil extending substantially along the entire airfoil area; and
a second airfoil separately mounted to the blade, said second airfoil arranged at a mutual distance transverse to the chord plane and extending along the root area of the blade.

2. The blade according to claim 1, wherein the second airfoil further extends along the transition region of the blade.

3. The blade according to claim 1, wherein the root area has a substantially circular cross-section and the transition area has a shape gradually changing from the substantially circular shape of the root area to a profile of the first airfoil.

4. The blade according to claim 1, wherein
the blade comprises at least a first root segment and a second root segment along substantially the entire root area,
the segments are at a mutual distance transverse to the chord plane, and
at least one of the first root segment and the second root segment has an airfoil profile.

5. The blade according to claim 4, wherein the chord plane of the at least one root segment with airfoil profile is substantially parallel to the chord plane of the blade itself in the root area closest to the hub.

6. The blade according to claim 4, wherein the first and the second root segments have first and second airfoil profiles.

7. The blade according to claim 4, wherein
the chord plane of the at least one root segment having an airfoil profile has a substantially constant width,
the chord plane of the transition area widens with increasing distance from the hub, and
the chord plane of the first airfoil narrows with increasing distance from the hub.

8. The blade according to claim 4 wherein the first and the second root segments join at a portion of the transition area closest to the hub.

9. The blade according to claim 4 wherein
the first and the second root segments merge into the first and the second transition segments, and
the first and the second transition segments join with a portion of the transition area furthest away from the hub.

10. The blade according to claim 4 wherein
the first and the second root segments merge into the first and the second transition segments, and
the first and the second transition segments join with the portion of the transition area furthest away from the hub.

11. The blade according to claim 10, wherein the portion of the root area where the first and second root segments join has a substantially circular cross section.

12. The blade according to claim 4 wherein
the first and the second root segments join and form a common mounting area at a portion of the root area.

13. The blade according to claim 1, wherein the chord plane of the blade twists up to 80 degrees in a longitudinal direction of the blade.

14. The blade according to claim 1, wherein
the transition area further comprises a first transition segment and a second transition segment,
the segments arranged at a mutual distance as seen transverse to the chord plane, and
at least one of the first and second transition segments has an airfoil profile.

15. The blade according to claim 14, wherein the chord plane of the at least one transition segment having an airfoil profile is substantially parallel to the chord plane of the blade at a transition between the blade transition area and the first airfoil area.

16. The blade according to claim 15, wherein
the first and the second root segments merge into the first and the second transition segments, and
the first and the second transition segments join with the portion of the transition area furthest away from the hub.

17. The blade according to claim 14, wherein
the first and the second root segments merge into the first and the second transition segments, and
the first and the second transition segments join with a portion of the transition area furthest away from the hub.

18. A blade for a rotor of a wind turbine having a substantially horizontal rotor shaft, said rotor comprising a hub, from which the blade extends substantially radially when mounted, said blade comprising:
a chord plane extending between the leading edge and the trailing edge of said blade;
a root area closest to the hub;
an airfoil area furthest away from the hub;
a transition area between the root area and the airfoil area;
an airfoil substantially along the entire airfoil area; and
a first root segment and a second root segment along substantially the entire root area, said segments arranged at a mutual distance transverse to the chord plane, wherein at least one of the first and second root segments has an airfoil profile and is a separately mounted segment.

* * * * *